Patented July 17, 1951

2,560,890

UNITED STATES PATENT OFFICE 2,560,890

RECOVERY OF STREPTOMYCIN FROM NAPHTHOL BLUE-BLACK SALT

Peter P. Regna, Woodcliff, N. J., and Isaiah A. Solomons, III, Jackson Heights, N. Y., assignors to Chas. Pfizer & Co., Inc., Brooklyn, N. Y., a corporation of New Jersey No Drawing. Application May 17, 1947, Serial No. 748,848

7 Claims. (Cl. 260—210)

This invention relates to the recovery of streptomycin from streptomycin dye salts, and it has for its object to provide a novel and improved process for this purpose.

Another object of the invention is to provide an efficient and economical method of separating streptomycin salts of high antibiotic activity from streptomycin dye salts.

Still another object is to separate streptomycin salts of high antibiotic activity from streptomycin-Naphthol Blue-Black salts which may be precipitated directly from crude aqueous solutions of streptomycin, such as fermentation broths.

Various other objects and advantages will be apparent as the nature of the invention is more fully disclosed.

Streptomycin, an antibiotic produced by fermentation from selected strains of cultures of *Streptomyces griseus*, is a highly potent antibacterial agent which is effective against a wide variety of pathogenic organisms. Clinical indications for the use of streptomycin have been observed in urinary tract infections due to gram negative microorganisms, influenza bacillus meningitis, tracheobronchitis and pneumonia, tularemia, ophthalmic infections due to *Ps. pyocaneus*, peritonitis due to gram negative organisms, and certain gram negative bacillary infections. Promising results have been obtained also in studies of tuberculosis.

It is known to absorb streptomycin or its salts from solutions upon activated carbon, and to elute it therefrom with solvents adjusted to a pH below neutral, but this procedure yields streptomycin along with much extraneous material since many other substances are simultaneously adsorbed and eluted. For this reason this method gives a product of low potency. It is also possible to prepare streptomycin concentrates by adsorption on zeolite or ion-exchange resins. However, in removing the streptomycin from these adsorbents by sodium or potassium chlorides, the streptomycin becomes contaminated with considerable amounts of these salts which are difficult to remove, and even after separation of the inorganic salts gives concentrates with a low streptomycin potency.

In our copending application, Serial No. 743,456, filed April 23, 1947, now Patent No. 2,538,847, we have disclosed that streptomycin is almost quantitatively precipitated from fermentation broths, in the form of a dye salt, by combining the streptomycin in the growth medium with the disodium salt of 8-amino-7-p-nitrophenylazo - 2 - phenylazo - 1 - naphthol-3,6-disulfonic acid, a dye which is also known as Naphthol Blue-Black (Color Index #246).

The present invention relates to a method of recovering streptomycin salts of high antibiotic activity by reacting the streptomycin salt of 8-amino-7-p-nitrophenylazo - 1 - naphthol - 3,6-disulfonic acid with an amine salt which will produce a metathesis reaction between the streptomycin dye and the amine salt in a liquid which is a solvent for both the reacting amine salt and the amine salt of 8-amino-7-p-nitrophenylazo - 1 - naphthol-3-6-disulfonic acid and is a non-solvent for the streptomycin salt produced thereby. The insoluble streptomycin salt thus produced may then be removed by filtration, centrifugation, etc.

A preferred method of converting streptomycin-Naphthol Blue-Black into its two components, according to the present invention, is to suspend the streptomycin-Naphthol Blue-Black in alcohols, ethers of ethylene glycol ("cellosolves"), and mixtures of water-acetone, water-alcohols and water-"cellosolves." To the mixture is then added an amine salt such as triethylamine sulfate. After sufficient shaking or stirring, the precipitated streptomycin sulfate is removed by filtration, thus leaving the triethylamine-Naphthol Blue-Black salt in the methanol solution. However, any soluble amine sulfate may be employed in the precipitation; conditions being that both the amine sulfate, and the amine salt of the dye, are soluble in alcohol, water or mixtures of the aforementioned solvents. These conditions are realized by a number of amines, such as, for example, dimethylaniline, diethylaniline, ethylamine, triethylamine, quinoline, pyridine, ethanolamine, etc. In addition to the amine sulfates, the streptomycin can be precipitated from solutions of streptomycin-Naphthol Blue-Black by other amine salts, such as amine phosphates, mucates, tartrates, oxalates, citrates, or other organic and inorganic acids which produce alcohol insoluble streptomycin salts and soluble amine Naphthol Blue-Black salts.

Other break-up procedures in which the streptomycin-Naphthol Blue-Black salt is first partially dissolved in acetone-water mixtures, methanol-water mixtures and other solvent mixtures, such as water-propanol, water-methyl "cellosolve," etc. take place, as described in the examples below. The conditions and situations described herein are applicable to streptomycin-Naphthol Blue-Black salt which has been obtained from fermentation broths, from eluates of adsorbents, and from solutions of partially purified streptomycin.

The microbiological assays on the streptomycin hereinafter referred to were carried out using *Escherichia coli* and *Bacillus subtilis* similar to those employed for penicillin asays. The *B. subtilis* plate assay is carried out by the method of Schmidt and Moyer (J. Bact., vol. 47, p. 199, (1944)), and the *E. coli* turbidimetric assay by the procedure of McMahan (J. Biol. Chem., vol. 153, p. 249, (1944)).

Example 1

Fifty liters of a filtered streptomycin fermentation broth (140 mcg./ml.) was adjusted to pH 5.5 with sulfuric acid and to it was added 350 g. of supercel (a diatamaceous earth filter aid) and 125 g. of Naphthol Blue-Black. The large amount of filter aid is not necessary for purposes of aiding the filtration, but is a means of keeping the precipitate well-dispersed in the subsequent conversion of the streptomycin-Naphthol Blue-Black salt. The mixture was stirred for one-half hour, filtered and the filtrate, containing 10 mcg./ml., was discarded. The streptomycin-Naphthol Blue-Black cake was partially dried on a Buechner funnel and was then divided into a number of portions from which the streptomycin was recovered, as described below, as well as in Examples 2 to 11.

Fifty grams of the wet streptomycin-Naphthol Blue-Black cake was suspended and shaken in 150 ml. of methanol, containing triethylamine sulfate. The insoluble streptomycin sulfate and supercel were filtered from the soluble triethylamine-Naphthol Blue-Black. The streptomycin sulfate was dissolved in water, filtered from the supercel, frozen, dried under high vacuum and further dried in a vacuum desiccator over barium oxide; the dried streptomycin sulfate when assayed against the Food and Drug Administration working standard gave an average potency of 530 mcg./mg. by the *B. subtilis* agar plate and the *E. coli* turbidimetric methods.

Example 2

Fifty grams of the wet streptomycin-Naphthol Blue-Black cake, obtained as described in Example 1, was suspended and shaken in 150 ml. of methanol, containing dimethylaniline sulfate. The insoluble streptomycin sulfate and supercel were filtered from the methanol soluble dimethylaniline-Naphthol Blue-Black. The streptomycin sulfate was dissolved in water, filtered from the supercel and poured into a large volume of methanol. The insoluble streptomycin sulfate was filtered, washed with methanol and dried in a vacuum desiccator; the dried streptomycin sulfate when assayed against the Food and Drug Administration working standard gave an average potency of 580 mcg./mg. by the *B. subtilis* agar plate and the *E. coli* turbidimetric methods.

Example 3

Fifty grams of the met streptomycin-Naphthol Blue-Black cake, obtained as described in Example 1, was suspended in 200 ml. of 1:1 acetone-water mixture and shaken after treating with a methanol solution of triethylamine sulfate. Four volumes of acetone was added and the precipitated streptomycin sulfate and supercel were separated from the solution by decantation. The gummy streptomycin sulfate was re-dissolved in water, filtered from the supercel, frozen, dried under high vacuum and further dried in vacuo over barium oxide; the dried streptomycin sulfate when assayed against the Food and Drug Administration working standard gave an average potency of 510 mcg./mg. by the *B. subtilis* agar plate and the *E. coli* turbidimetric methods.

Example 4

Fifty grams of the wet streptomycin-Naphthol Blue-Black cake, obtained as described in Example 1, was suspended and shaken in 150 ml. of methanol, containing triethylamine citrate. The insoluble streptomycin citrate and supercel were filtered from the soluble triethylamine-Naphthol Blue-Black. The streptomycin citrate was dissolved in water, filtered from the supercel, frozen, dried under high vacuum and further dried in a vacuum desiccator over barium oxide; the dried streptomycin citrate when assayed against the Food and Drug Administration working standard gave an average potency of 460 mcg./mg. by the *B. subtilis* agar plate and the *E. coli* turbidimetric methods.

Example 5

Fifty grams of the wet streptomycin-Naphthol Blue-Black cake, obtained as described in Example 1, was dissolved in 50 ml. of methyl "cellosolve," the supercel was filtered, and the filtrate was treated with a methanol solution of triethylamine sulfate. The precipitated streptomycin sulfate was filtered, frozen, dried under high vacuum and further dried in a vacuum desiccator over barium oxide; the dried streptomycin sulfate when assayed against the Food and Drug Administration working standard gave an average potency of 530 mcg./mg. by the *B. subtilis* agar plate and the *E. coli* turbidimetric methods.

Example 6

Fifty grams of the wet streptomycin-Naphthol Blue-Black cake, obtained as described in Example 1, was suspended and shaken in 150 ml. of methanol, containing ethylamine sulfate. The insoluble streptomycin sulfate and supercel were filtered from the methanol-soluble ethylamine-Naphthol Blue-Black. The streptomycin sulfate was dissolved in water, filtered from the supercel, frozen, dried under high vacuum and further dried in a vacuum desiccator over barium oxide; the dried streptomycin sulfate when assayed against the Food and Drug Administration working standard gave an average potency of 510 mcg./mg. by the *B. subtilis* agar plate and the *E. coli* turbidimetric methods.

Example 7

Fifty grams of the wet streptomycin-Naphthol Blue-Black cake, obtained as described in Example 1, was suspended and shaken in 150 ml. of methanol, containing ethanolamine sulfate. The insoluble streptomycin sulfate and supercel were filtered from the soluble ethanolamine-Naphthol Blue-Black. The streptomycin sulfate was dissolved in water, filtered from the supercel, frozen, dried under high vacuum and further dried in a vacuum desiccator over barium oxide; the dried streptomycin sulfate when assayed against the Food and Drug Administration working standard gave an average potency of 540 mcg./mg. by the *B. subtilis* agar plate and the *E. coli* turbidimetric methods.

Example 8

Fifty grams of the wet streptomycin-Naphthol Blue-Black cake, obtained as described in Example 1, was suspended and shaken in 150 ml. of methanol, containing triethylamine mucate. The insoluble streptomycin mucate and supercel were filtered from the soluble triethylamine-Naphthol Blue-Black. The streptomycin mucate was dissolved in water, filtered from the supercel, frozen, dried under high vacuum and further dried in a vacuum desiccator over barium oxide; the dried streptomycin mucate when assayed against the Food and Drug Administration working standard gave an average potency of 410 mcg./mg. by the *B. subtilis* agar plate and the *E. coli* turbidimetric methods.

*Example 9*

Fifty grams of the wet streptomycin-Napthol Blue-Black cake, obtained as described in Example 1, was suspended and shaken in 150 ml. of methanol, containing triethylamine oxalate. The insoluble streptomycin oxalate and supercel were filtered from the soluble triethylamine-Naphthol Blue-Black. The streptomycin oxalate was dissolved in water, filtered from the supercel, frozen, dried under high vacuum and further dried in a vacuum desiccator over barium oxide; the dried streptomycin oxalate when assayed against the Food and Drug Administration working standard gave an average potency of 470 mcg./mg. by the *B. subtilis* agar plate and the *E. coli* turbidimetric methods.

*Example 10*

Fifty grams of the wet streptomycin-Naphthol Blue-Black cake, obtained as described in Example 1, was suspended and shaken in 150 ml. of methanol, containing triethylamine tartrate. The insoluble streptomycin tartrate and supercel were filtered from the soluble triethylamine-Napthol Blue-Black. The streptomycin tartrate was dissolved in water, filtered from the supercel, frozen, dried under high vacuum and further dried in a vacuum desiccator over barium oxide; the dried streptomycin tartrate when assayed against the Food and Drug Administration working standard gave an average potency of 490 mcg./mg. by the *B. subtilis* agar plate and the *E. coli* turbidimetric methods.

*Example 11*

Fifty grams of the wet streptomycin-Naphthol Blue-Black cake, obtained as described in Example 1, was suspended and shaken in 150 ml. of methanol, containing quinoline phosphate. The insoluble streptomycin phosphate and supercel were filtered from the soluble quinoline-Naphthol Blue-Black. The streptomycin phosphate was dissolved in water, filtered from the supercel, frozen, dried under high vacuum and further dried in a vacuum desiccator over barium oxide; the dried streptomycin phosphate when assayed against the Food and Drug Administration working standard gave an average potency of 450 mcg./mg. by the *B. subtilis* agar plate and the *E. coli* turbidimetric methods.

The invention claimed is:

1. In a process for the purification and recovery of streptomycin, the steps of mixing a crude streptomycin-Naphthol Blue-Black salt with a solvent of the group consisting of acetone, methanol, propanol and ethylene glycol monomethyl ether, reacting said mixture with an amine salt selected from the group consisting of the sulfates, phosphates, oxalates, citrates, mucates and tartrates of dimethylaniline, diethylaniline, ethylamine, triethylamine, quinoline, pyridine and ethanolamine, whereby the corresponding acid salt of streptomycin is precipitated, and separating said insoluble salt of streptomycin from the resulting solution of the corresponding amine salt of Naphthol Blue-Black.

2. A process as claimed in claim 1, wherein the solvent employed is methanol.

3. A process as claimed in claim 1, wherein the amine salt employed is a salt of triethylamine.

4. A process as claimed in claim 1, wherein the amine salt employed in a sulfate.

5. A process as claimed in claim 1, wherein the amine salt employed is a citrate.

6. A process as claimed in claim 1, wherein the amine salt employed is a tartrate.

7. A process as claimed in claim 1, wherein the solvent contains water.

PETER P. REGNA.
ISAIAH A. SOLOMONS, III.

REFERENCES CITED

The following references are of record in the file of this patent:

UNITED STATES PATENTS

| Number | Name | Date |
|---|---|---|
| 2,022,678 | Kritchevsky | Dec. 3, 1935 |
| 2,446,102 | Peck | July 27, 1948 |
| 2,462,175 | Folkers | Feb. 22, 1949 |

OTHER REFERENCES

Peck et al., Jour. Amer. Chem. Soc., vol. 68—pp. 772–776, May 1946.

Kuehl et al., Jour. Amer. Chem. Soc., vol. 68—pp. 1460–1462, Aug. 1946.

Kuehl et al., Science, vol. 102 (1945), pages 34–35, 2 pages.

Ephraim, "Inorganic Chemistry," 4th ed. (1943), page 577, 1 page.

Carter et al., J. Biol. Chem., vol. 160 (1945), pages 338–339, 2 pages.

Certificate of Correction

Patent No. 2,560,890                                      July 17, 1951

PETER P. REGNA ET AL.

It is hereby certified that error appears in the printed specification of the above numbered patent requiring correction as follows:

Column 3, line 66, for "met" read *wet*; column 6, line 27, for "in" read *is*; and that the said Letters Patent should be read as corrected above, so that the same may conform to the record of the case in the Patent Office.

Signed and sealed this 9th day of October, A. D. 1951.

[SEAL]

THOMAS F. MURPHY,
*Assistant Commissioner of Patents.*